US005228815A

United States Patent [19]

Gignac et al.

[11] Patent Number: 5,228,815

[45] Date of Patent: Jul. 20, 1993

[54] DETACHABLE DEVICE FOR JOINING TOGETHER OBJECTS WHICH EACH HAVE A HOLE

[75] Inventors: Jacques Gignac, Lille; Patrice Maurel; Sylvain Guerin, both of Seclin, all of France

[73] Assignee: Dassault Aviation, France

[21] Appl. No.: 943,566

[22] Filed: Sep. 11, 1992

[30] Foreign Application Priority Data

Sep. 19, 1991 [FR] France ................................ 91 11554

[51] Int. Cl.[5] ............................................ F16B 13/06

[52] U.S. Cl. ........................................ 411/45; 411/44; 411/70; 411/907

[58] Field of Search .................................... 411/34–38, 411/43, 45–48, 69, 70, 80, 907, 55, 44

[56] References Cited

U.S. PATENT DOCUMENTS

| | | | |
|---|---|---|---|
| 2,353,248 | 7/1944 | Lamb . | |
| 3,973,789 | 8/1976 | Kunz et al. | 411/55 X |
| 4,306,824 | 12/1981 | Tanaka et al. | 411/70 X |
| 4,447,944 | 5/1984 | Mohrman | 411/70 X |
| 4,715,755 | 12/1987 | Hesselmar | 411/80 X |
| 4,936,726 | 6/1990 | Medard . | |

FOREIGN PATENT DOCUMENTS

| | | | |
|---|---|---|---|
| 956322 | 4/1964 | United Kingdom | 411/44 |

*Primary Examiner*—Neill R. Wilson
*Attorney, Agent, or Firm*—Stevens, Davis, Miller & Mosher

[57] ABSTRACT

Detachable device for joining together objects having holes intended to come into alignment, comprising:

- a tubular member made of an elastically deformable material and capable of passing through the holes when it is in the expanded state and of widening in order to be locked in the holes,
- an expansion rod sliding inside the tubular member and having a widened head,
- a body fastened to the tubular member and having a bore which extends the bore of the tubular member, and a support surface substantially at right angles to said bore,
- a locking member which can be immobilized at any point on the rod,
- an elastic member capable of exerting a determined force tending to move the body away from the locking member.

The tubular member, the body and the elastic member preferably form a single piece.

9 Claims, 2 Drawing Sheets

DETACHABLE DEVICE FOR JOINING TOGETHER OBJECTS WHICH EACH HAVE A HOLE

BACKGROUND OF THE INVENTION

The present invention relates to a detachable device intended to hold together a plurality of objects, such as metal sheets.

The present invention has been developed to deal with the following problem: when it is necessary to fasten two sheets together, for example by riveting, the sheets must first be laid one on the other in the appropriate relative position and clamped so as to hold them in this relative position during the fastening operations, which may comprise the piercing of a hole passing through the two sheets, placing a rivet in position in this hole, and the shaping of this rivet.

For this purpose holes are prepared in advance in each of the sheets which are to be fixed together, these holes having to come into line with one another when the sheets are in the correct position, and then, after the sheets have been brought together, provisional fastening devices, known as "pinning clips" or more simply "pins", are inserted into these holes, these devices having an expansible rod which can penetrate into the holes in the sheets and then be widened out therein to effect centering, while a sliding body, pressed with the interposition of a spring by a nut screwed onto the expansible rod, clamps the sheets one against the other with a controlled force.

The expansible rod conventionally consists of a metal tube, an end part of which is divided into a plurality of sectors by longitudinal slits, and of an expansion rod slidable inside the tube and having a widened head with a section larger than the inside section of the slit part of the tube but smaller than that of the holes. By pulling the expansion rod so as to cause the head to penetrate into the slit part of the tube the sectors of the latter, which are formed by the longitudinal slits, are opened out until they come to bear against the interior of a hole.

Pins in use at the present time are relatively complicated devices, and therefore relatively expensive. Moreover, when the sectors of the tube are opened out they may damage or deform the interior of the hole, particularly the edge at the end of the hole. In addition, they project over a relatively considerable length on one of the sheets which are to be fastened together, thus complicating the positioning of the tools required for the riveting and possibly hindering automatic work when these tools are carried by a robot arm.

In U.S. Pat. No. 4,936,726, J. MEDARD, a pin of a type similar to that described above has been proposed, in which the expansible rod comprises two elastic blades diametrically opposite in relation to an axis and carrying, at their ends, radially widened hooking members. By axially moving the elastic blades relative to a fixed axial cylindrical rod, the hooking members are displaced radially. Said members are surrounded by a protective tube of deformable material. This arrangement avoids the risk of damaging the interior of the hole, but is more complicated than that of the prior art because of the presence of the protective tube.

In U.S. Pat. No. 2,353,248, W. H. LAMB, a pin has also been proposed in which the tubular member is itself of elastically deformable material and is held axially by an end which bears against the body. The head has a plane radial surface which comes to bear against the other end of the tubular member, this end likewise consists of a plane radial surface. Movement of the head towards the body entails axial compression of the tubular member, and the latter is forced to widen out radially.

This device has a smaller number of components than the previous device, but this number is still fairly large. Furthermore, the radial deformation of the tubular member requires substantial forces. This has the consequence that the device must be stronger than those of the prior art, and this increases its cost. Moreover, the life of the tubular member, which is heavily stressed, is shortened.

The object of the present invention is to provide a pinning clip which is simpler and less expensive than those of the prior art, and which in addition cannot damage or deform the hole.

Another object of the invention is to provide a device of this kind which is less bulky than those currently in use.

Yet another object of the invention is to provide a device of this kind which is decidedly quicker to use than the devices currently in use.

SUMMARY OF THE INVENTION

In order to achieve this result the invention provides a detachable device for joining together objects which each have a hole, the holes in said objects having substantially the same section and being intended to come into alignment when the objects are joined together, this device comprising:

a tubular member expansible at one of its ends and capable of passing through said holes in the retracted state but not in the expanded state, an expansion rod sliding inside the expansible tubular member and having a widened head which is fastened to the rod and has a section larger than the inside section of the expansible part of the tubular member and smaller than that of the holes, said head being capable of effecting the expansion of the tubular member through the action of an axial displacement of the rod, a body fastened to the tubular member and having a bore which extends the bore of the tubular member and in which the expansion rod can slide, and having a support surface intended to come into contact with one of the objects and being substantially at right angles to said bore, a locking member which can be displaced along a part of the rod outside said expansible part and be immobilized at any point on this part, an elastic member capable of exerting a determined force tending to move the body away from the locking member, said device having the characteristic that the tubular member, the body and the elastic member constitute a single piece made of said elastically deformable material.

This piece may be produced by molding, which results in a further substantial saving in production costs. Furthermore, the risk of losing one of the components of the device is reduced if it now consists of only three components. In addition, because the elastic member is integrated into the body the dimensions of the whole arrangement can be considerably reduced.

The head preferably has at least one frustoconical part which is connected to the rod and effects the expansion of the tubular member by the penetration of this frustoconical part into the open end of the tubular member.

The axial force necessary for effecting the widening of the tubular member is thus considerably reduced, thus further contributing towards reduction of the cost price and the size of the device. The rubbing of the head against the inside surface of the tubular member nevertheless entails a certain, comparatively slight axial compression of this member, in the part situated between the head and the body, and consequently in the interior of the holes in the objects which are to be joined together. The radial widening resulting from this axial compression contributes towards improving the relative centering of the holes.

The piece preferably comprises a solid block, which constitutes both the body and the elastic member, and a tubular extension which constitutes said expansible tubular member.

The single piece is thus composed only of two parts, both of which may be cylindrical, thereby considerably facilitating production of the molds.

It is however possible to make the tubular member, the elastic member and the body as separate components, joined together, for example, by adhesive bonding, welding or interlocking. In this case only the first two components mentioned have to be of elastically deformable material.

In an advantageous embodiment the locking member is a rigid piece provided with a through passage for the expansion rod and capable of assuming a first orientation, relative to said rod, in which the latter is wedged in said passage, and a second orientation forming a certain angle with the first and enabling the rod to slide freely in said passage.

The locking member thus acts by wedging, thereby permitting much faster manipulations than screwing. A further saving in cost price can be achieved by eliminating the screw threads required for screw fixing between the locking member and the rod.

BRIEF DESCRIPTION OF THE FIGURES

Particular embodiments are indicated in the following examples, which are illustrated with the aid of the figures, in which.

DETAILED DESCRIPTION OF EMBODIMENTS OF THE INVENTION

Figures 1A, 1B, 1C, 1D, 1E, 1F, 1G, 1H, 1I, 1J:
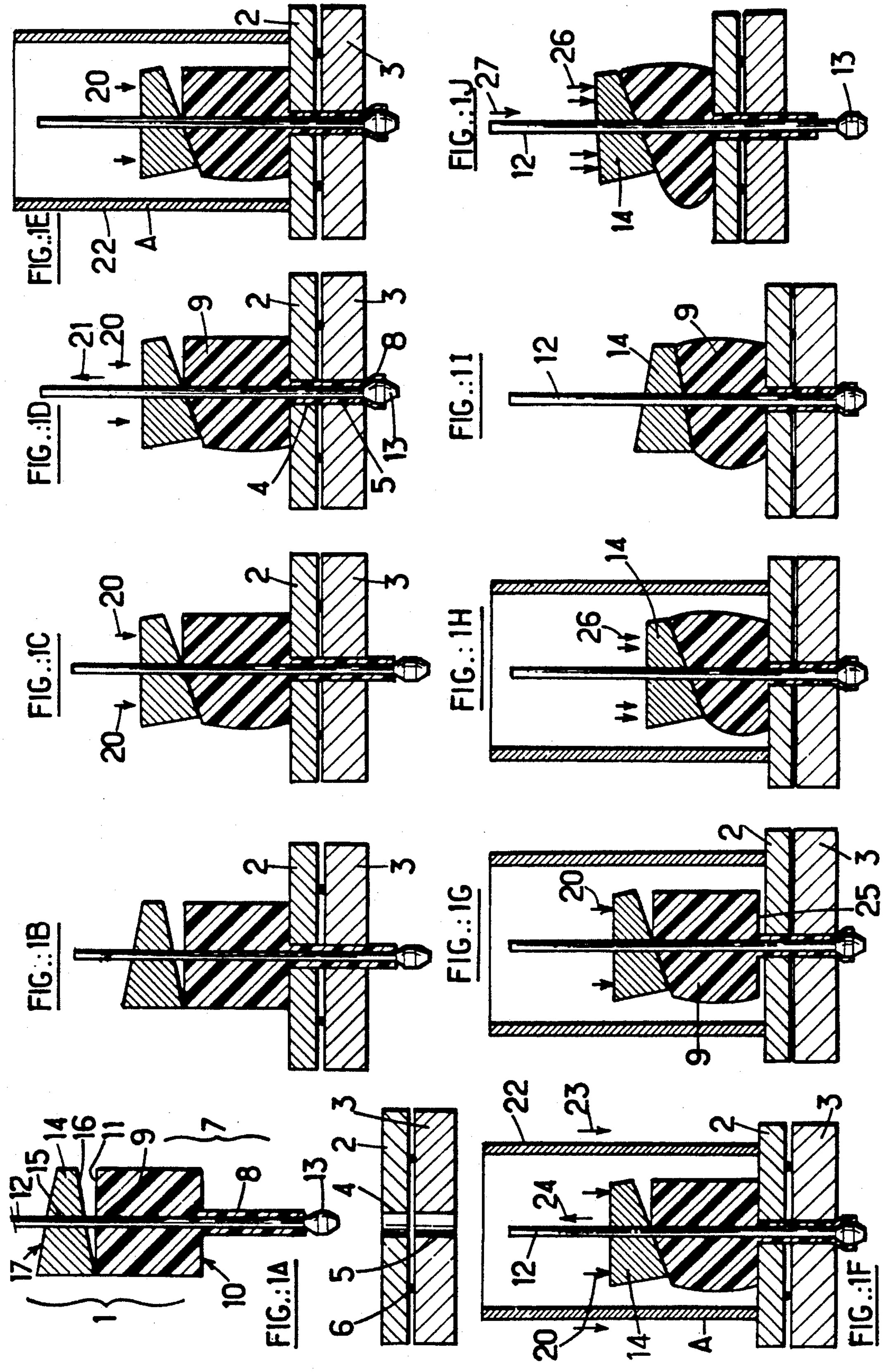
FIGS. 1A to 1J show the different stages in an operation for positioning a pin according to the invention.

FIG. 1A shows a pin according to the invention, which will be used to join together a sheet 2, called the top sheet, and a second sheet 3, called the bottom sheet. The sheet 2 has a hole 4 and the sheet 3 has a hole 5, these holes having previously been brought approximately into alignment. A seal 6 of non-elastic deformable material is placed between the sheets 2 and 3 and surrounds the holes 4 and 5.

The pin 1 comprises a single piece 7, molded in polyurethane rubber and consisting of three parts: a tubular member 8 having a diameter slightly smaller than that of the holes 4 and 5, a cylindrical body 9 coaxial to the tubular member 8 and provided with a bore extending that of the tubular member 8. The body 9 is limited by a first plane surface 10, which carries the tubular member 8, and a second plane surface 11 situated on the opposite side.

An expansion rod 12 is free to slide in the bores in the tubular member 8 and the body 9. It ends in a head 13 comprising a cylindrical part and two frustoconical parts, one of which is connected to the remainder of the rod; the maximum diameter of the head 13, that is to say that of its cylindrical part, is slightly smaller than that of the holes 4 and 5.

A locking member 14 is composed of a single piece of steel, through which a bore 15 extends. The exact shape of this bore will be explained further on with reference to FIG. 4, as well as the shape of that part of the rod 12 which cooperates with said bore. In order to explain its operation, it is sufficient to say that the locking member 14 has two plane, nonparallel surfaces: a bottom surface 16 facing the body 9 during operation and a top surface 17, these two surfaces being plane and forming together an angle of about 20°. The expansion rod 12 and the locking member 14 are free to slide relative to one another when the top surface 17 is at right angles to the axis of the rod 12, as can be seen in particular in FIG. 1C, while on the contrary they are locked when the surface 17 is oblique in relation to said axis, for example when the surfaces 16 and 17 form equal but opposite angles to the axis of the rod 12, as shown in FIG. 1A.

In the situation illustrated in FIG. 1A, the locking member 14 rests with an edge of its bottom surface 16 on an edge of the top surface 11 of the body 9, so that locking is maintained. The assembly formed by the body 7, the rod 12 and the locking member 14 therefore behaves as a unitary assembly. Holding it by the rod 12 or by the body 9, it is therefore possible to introduce the head 13 and the tubular member 8 into the holes 4 and 5, thereby making, if necessary, an improvement in the relative centering of the sheets 2 and 3. The position shown in FIG. 1B is thus reached, in which the bottom surface 10 of the body 9 rests on the sheet 2, while the head 13 and the end of the tubular member 8 project on the opposite side of the sheet 3.

In order to effect the expansion of the tubular member 8, the first step is to unlock the rod. To do this, a force, symbolized by the arrow 20, is applied to the locking member 14, tending to bring the top surface 17 into the position shown in FIG. 1C, that is to say at right angles to the rod 12. As can be seen in FIG. 1C, the effect of the forces 20, in addition to the unlocking, is to deform the body 9, which then behaves like a spring.

While the force 20 is maintained, a force in the opposite direction, symbolized in FIG. 1D by the arrow 21 and intended to cause the head 13 to penetrate into the tubular member 8, is then applied to the rod 12, which is now unlocked. This has the main effect of causing the expansion of the tubular member 8, which at the level of the head 13, acquires a diameter substantially larger than that of the hole 5 and prevents further continuation of the movement of the head 13, preventing it from penetrating into the hole 5. A second effect of the operation is that the portion of the tubular member 8 situated between the zone adjacent to the head 13 and the body 9 is in compression, thus bringing about an increase in its diameter (not visible in the figure). This increase in diameter has the consequence that the tubular member 8 comes to bear against the wall of the holes 4 and 5, thus completing their relative centering.

It should however be observed that the forces 20 are weak forces, intended essentially to bring about or maintain the unlocking. If the forces 20 were too powerful, there would be a risk of nipping the material of the tubular member 8 between the two sheets, which must be avoided.

The continuation of the operation comprises bringing the sheets into contact with one another through the crushing of the seal 6. To do this, a tubular support member 22 is applied against the sheet 2, surrounding the pin 1, as illustrated in FIG. 1E. A compressive force 23 is then exerted on the sheet 1 with the aid of the support member 22, simultaneously with the application of a tractive force 24 exerted on the rod 12, so as to bring the sheets 2 and 3 together and crush the seal. It should be observed that during this time the member 14 is held in the unlocking position either by the application of the forces 20 or simply by holding the member 14 in the orientation corresponding to unlocking. Because the member 14 is free to slide relative to the rod 12, the compression of the body 9, acting as a spring, is reduced on the displacement of the sheet 2 towards the sheet 3, as is symbolized in FIG. 1G by a clearance 25 shown between the body 9 and the top sheet 2.

Forces 26, the intensity of which is far greater than that of the forces 20 serving solely to effect unlocking, are then exerted on the locking member 14 (FIG. 1H). The forces 26 are in fact intended to hold the sheets 2 and 3 in the contact position during the subsequent operations of fastening by riveting or other means.

After the application of the forces 26, they are relaxed, thus locking the member 14 on the rod 12, and it is the body 9, powerfully compressed and consequently acting as a spring of appropriate power, that holds the sheets 2 and 3 in contact, as indicated in FIG. 1I.

For the purpose of removing the pin at the end of the operation, it is sufficient to apply a force 26 once more to the locking member 14 so as to effect the unlocking, thus making it possible for the rod 12 to be moved downwards, as shown by the arrow 27 in FIG. 1I. The head 13 then passes out of the tubular member 8, thus terminating the expansion of the latter. It is then possible to withdraw the pin so as to return to the situation shown in FIG. 1A.

It will be observed that all the operations are carried out by coaxial displacements of the rod 12, of the support member 22, or of an actuating member for the locking member 14, which actuating member may be a tube which is coaxial to the rod and to the support member and whose end must simply be at right angles to the axis. Automation of the operations is therefore facilitated to a remarkable extent with the pin according to the invention.

Figure 2B:
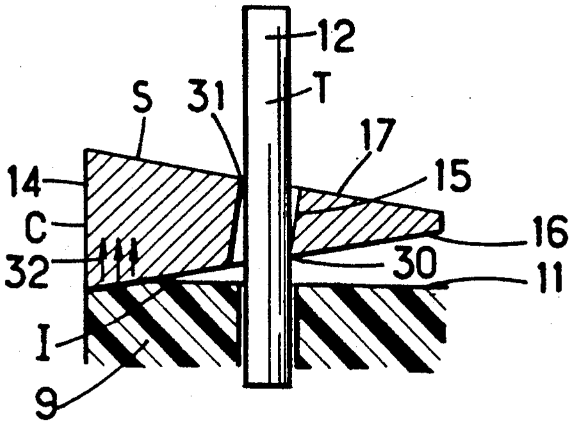
FIGS. 2A and 2B illustrate the mode of operation of a locking member acting by wedging.
Figure 2A:
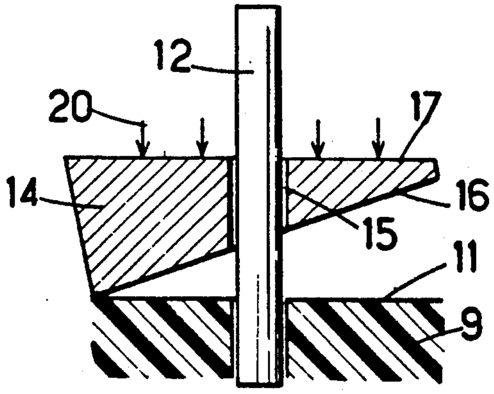

The essential part played by the locking member 14 in the operation will have been noted. FIGS. 2A and 2B enable the principle of its function to be better explained. The wedge-shaped member 14 is shown in FIG. 2A in the unlocking position under the action of the forces 20 parallel to the rod 12. The top surface 17 of the member 14 is held at right angles to the rod 12 through the action of the forces 20. The bottom surface 16 of the same member 14 comes to bear against the top surface 11 of the body 9 of elastomer material. It will be seen that the bore 15 has a diameter substantially larger than that of the rod 12, so that the latter is able to slide freely in relation to the member 14.

In FIG. 2B, on the other hand, the member 14 is disposed with its top surface 17 oblique relative to the rod 12. This has the consequence that at the two ends 30, 31 of the bore 15 there is a wedging action, in one direction or the other, on the locking member in relation to the rod 12. The elastic material of the body 9 applies laterally, to the bottom surface 16 of the member 14, forces 32 which tend to hold this member 14 in its oblique position, and therefore to increase the wedging of the ends 31 and 32 of the bore 15.

Figure 3B:
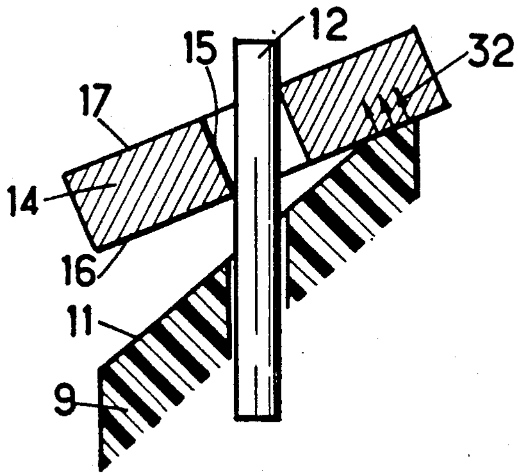
FIGS. 3A and 3B illustrate the mode of operation of another locking member acting by wedging.
Figure 3A:
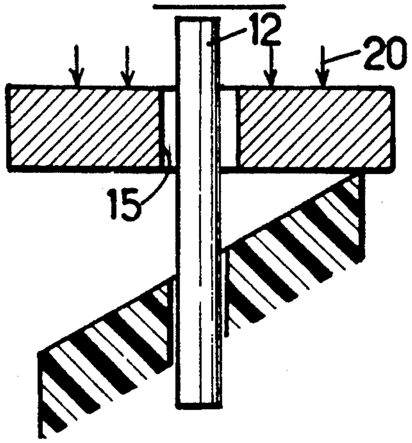

The shape described for the body 9 and the member 14 is not indispensable. Another construction is shown in FIGS. 3A and 3B. In this case, the locking member 14 is in the form of a plate having plane parallel faces 16, 17 through which a bore 15 extends at right angles to said faces 16, 17. The top surface 11 of the body 9, on the other hand, is oblique in relation to the direction of the rod 12. It can be seen that in this case also it is possible to effect locking through the action of forces 20 parallel to the rod 12, and locking with the aid of forces 32 exerted non-centrally by the body 9 on the locking member 14. Other shapes are of course also possible, but the two shapes just described are the simplest. The selection of one or the other is dictated by appropriateness: it is easier to produce a metal part having plane parallel faces than a wedge-shaped metal part, but on the other hand the machining of a mold to produce a part 9 of elastomer material which has an oblique surface is necessarily more expensive than for a cylindrical part having faces at right angles to the axis.

Figure 4:
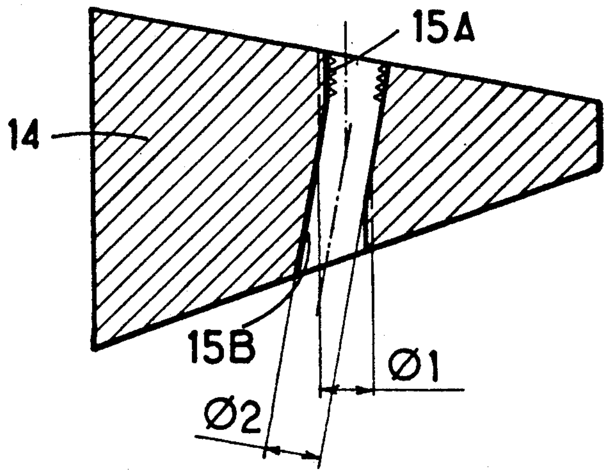
FIG. 4 shows a preferred construction of the locking member.
Figure 5:
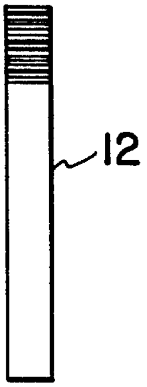
FIG. 5 shows an expansion rod for use with the device of FIG. 4.

FIG. 4 shows a particularly advantageous variant. The passage for the expansion rod is composed of two bores 15A, 15B, which meet inside the locking member and form together an angle which may be of the order of 20°. The first bore 15A is threaded and the expansion rod 12, as shown in FIG. 5 has a corresponding screw thread.

The second bore 15B is smooth and has a diameter $\phi 2$ larger than the diameter $\phi 1$ of the first bore 15A, this last-mentioned diameter being taken at the bottom of the screw thread and consequently corresponding to the outside diameter of the rod 12A. It will immediately be understood that tilting of the member 14 in order to move it from an orientation in which the rod 12 is situated in the first bore 15A to an orientation in which the rod is situated in the bore 15B corresponds to passing from a very effective locking situation to a situation of perfectly free sliding.

An arrangement of this kind is obviously more expensive than a simple cylindrical bore, but it provides very great security against the risk of unintentional unlocking.

It is obviously possible to produce a passage of the same type in a locking member having parallel faces, as illustrated in FIGS. 3A and 3B.

What is claimed is:

1. A detachable device for joining together objects which each have a hole, the holes in said objects having substantially the same section and being intended to come into alignment when the objects are joined together, the device comprising:

an expansible tubular member which is made of an elastically deformable material and, when at rest, is able to pass through said holes and is capable of sufficient expansion to be immobilized in he holes, an expansion rod sliding inside the expansible tubular member and having a widened head which is fastened to the rod and has a section larger than the inside section of the tubular member and smaller than the section of the holes, said head being capable of effecting the expansion of the tubular member through the action of an axial displacement of the rod, a body fastened to the tubular member and having a bore which extends the bore of the tubular member and in which the expansion rod can slide, said body having a support surface intended to come into contact with one of the objects and being substantially at right angles to said bore, a locking member which can be displaced along a part of the rod outside said expansible part and be immobilized at any point on said part, said locking member being a riding piece provided with a through passage for the expansion rod and capable of assuming a first orientation, relative to said rod, in which the rod is wedged in said passage, and a second orientation forming a certain angle with the first orientation and enabling the rod to slide freely in said passage, wherein the tubular member and the body cooperate as a single piece of elastically deformable material.

2. The device of claim 1, wherein he head has at least one frustoconical pat which is connected to the rod and effects the expansion of the tubular member by the penetration of this frustoconical part into the open end of the tubular member.

3. The device of claim 1, wherein the piece comprises a solid block, which constitutes both the body and the elastic member, and a tubular extension which constitutes said expansible tubular member.

4. The device of claim 1, wherein the locking member has a first surface on which the elastic member acts to bring the locking member into the first orientation, and a second surface which is approximately at right angles to the rod when the locking member is in the second orientation.

5. The device of claim 4, wherein the elastic member has a thrust surface which is directed oppositely to the support surface and which is approximately at right angles to the bore, and the first surface of the locking member forms with the first surface an angle at least equal to that of the two orientations.

6. The device of claim 4, wherein the elastic member has a thrust surface which is directed approximately oppositely to the support surface and forms with the latter an angle at least equal to the angle between the two orientations of the locking member, and the two surfaces of said locking member are parallel.

7. The device of claim 1, wherein the passage provided for the expansion rod in the locking member is composed of two bores whose axes form together an angle equal to that of said orientations and which meet inside said locking member, the first bore having a shape and a section designed to oppose the sliding of the expansion rod, and the second bore having a shape and a section designed to permit said sliding of said rod.

8. The device of claim 7, wherein the first bore and also that part of the expansion rod which is intended to cooperate with it are threaded, and the second bore is smooth and has a diameter larger than the outside diameter of the rod.

9. The device of claim 1, wherein the tubular member is made of a polyurethane elastomer.

* * * * *

UNITED STATES PATENT AND TRADEMARK OFFICE

CERTIFICATE OF CORRECTION

PATENT NO. : 5,228,815

DATED : July 20, 1993

INVENTOR(S) : GIGNAC et al.

It is certified that error appears in the above-identified patent and that said Letters Patent is hereby corrected as shown below:

Column 7, line 16, "riding" should read --rigid--.

Column 7, line 25, "he" should read --the--.

Column 7, line 26, "pat" should read --part--.

Signed and Sealed this

Fifth Day of July, 1994

Attest:

Bruce Lehman

BRUCE LEHMAN

*Attesting Officer*

*Commissioner of Patents and Trademarks*